United States Patent [19]
Shavitz

[11] Patent Number: 5,697,671
[45] Date of Patent: Dec. 16, 1997

[54] MOTORCYCLE SEAT ENLARGER

[76] Inventor: Alan D. Shavitz, 801 Wiltshire Dr., Evansville, Ind. 47715

[21] Appl. No.: 651,385

[22] Filed: May 22, 1996

[51] Int. Cl.$^6$ ................................................ A47C 1/08
[52] U.S. Cl. ...................... 297/250.1; 297/214; 297/243
[58] Field of Search ........................ 297/250.1, 195.13, 297/199, 214, 219.11, 216.16, 232, 239, 243, 440.22

[56] References Cited

U.S. PATENT DOCUMENTS

| | | |
|---|---|---|
| 570,033 | 10/1896 | Machold . |
| 1,081,326 | 12/1913 | Parker . |
| 2,147,361 | 2/1939 | Bloomberg . |
| 3,269,773 | 8/1966 | O'Connor .................... 297/243 X |
| 3,712,670 | 1/1973 | Svehla et al. .................. 297/214 X |
| 4,563,038 | 1/1986 | Hirose . |
| 4,779,924 | 10/1988 | Rudel . |
| 4,804,221 | 2/1989 | Saiki .......................... 297/243 X |
| 4,909,522 | 3/1990 | Hanigan ...................... 297/214 X |
| 5,318,344 | 6/1994 | Wang .......................... 297/214 X |
| 5,322,345 | 6/1994 | Dresser et al. . |
| 5,533,783 | 7/1996 | Harms et al. ................ 297/243 X |
| 5,553,915 | 9/1996 | Stamatakis ................ 297/195.13 |

FOREIGN PATENT DOCUMENTS

| | | | |
|---|---|---|---|
| 702574 | 4/1931 | France | 297/243 |
| 1088061 | 3/1955 | France | 297/214 |
| 1296910 | 5/1962 | France | 297/214 |
| 2470722 | 6/1981 | France | 297/214 |

OTHER PUBLICATIONS

1995 Harley–Davidson Parts and Accessories Catalog, pp. 32, 42, 43, and 48.

Hot Bike Magazine, Dec. 1995; 3 Advertisements: (1) "Ultraride" (2) Phantom Pad; (3) King Seat for Royal Pains in the Butt.

Primary Examiner—Laurie K. Cranmer
Attorney, Agent, or Firm—Wood, Herron & Evans, L.L.P.

[57] ABSTRACT

The seat of a motorcycle is enlarged in size and made more comfortable for long distance riding by a removable seat enlarger which nests over and substantially covers the seat and which provides an extended and more comfortable seating surface. The enlarger includes a rigid frame which is shaped to closely embrace the seating surface and upper sides of the seat, and is secured thereon by releasable securing means. The enlarger may have a front which provides additional back support for the driver.

12 Claims, 3 Drawing Sheets

MOTORCYCLE SEAT ENLARGER

FIELD OF THE INVENTION

This invention relates to an attachment for enlarging the seating area of the original or existing seat of a motorcycle.

BACKGROUND

Many if not most motorcycles are originally supplied by the manufacturer with a driver seat and a passenger seat behind the driver seat. The passenger seat may be separate from the driver seat or an integral rearward extension of it. Often a passenger backrest, in the form of an inverted generally U-shaped bar, is mounted immediately behind the passenger seat so that the passenger can lean against it or grip with his hands. The driver seat is usually but not always relatively large and comfortable, but the passenger seat is usually shaped more for form than function and is typically narrow and elongated so as to present a more aesthetic appearance when a passenger is not being carried. The narrowness or small area of a seat tends to make it rather uncomfortable, especially on long rides, and thus tends to limit riding time and enjoyment. While the larger seats are available as original equipment manufacturer (O.E.M.) and aftermarket options, a large seat is sometimes considered to detract from the appearance of the bike, especially when a passenger is not being carried. The original or aftermarket passenger seat is not removable, at least quickly removable, when the bike is to be ridden by the driver alone.

There has, therefore, been a need for a seat attachment which will provide more comfortable seating, especially for a passenger, or alternatively for a driver, and which can be readily installed and removed when desired.

THE PRIOR ART

Add-on seats for bicycles and motorcycles are known, as taught in U.S. Pat. Nos. 1,081,326; 2,147,361; and 5,322,345, but those seats are attached directly to the vehicle fender, and do not interfit with an existing passenger seat. U.S. Pat. No. 4,779,924 provides a spring cushioned attachment that mounts on the top of an existing motorcycle seat to provide cooling air-flow passages beneath the rider. U.S. Pat. No. 4,563,038 shows a permanent driver seat and passenger seat assembly for a motorcycle, in which the passenger seat is adjustably positioned fore and aft on a track and runner assembly, by a fluid cylinder. The passenger's seat is formed on a channel frame, the front portion of which overlaps the rear portion of the driver's seat.

SUMMARY OF THE INVENTION

This invention provides a "enlarger" which is easily mountable over an existing passenger or driver seat to increase its seating area and comfort, yet which is very stable in use. The enlarger has its own frame, cushioning and seat configuration, and nests over the underlying seat. The nested interfit stabilizes the enlarger against displacement from the underlying seat; and the enlarger can be further supported by strapping it to the backrest and/or to the cycle frame. The enlarger can easily be removed, so as to return the bike to its previous seat configuration.

The seat enlarger comprises a substantially rigid frame which is preferably shaped to closely embrace the underlying seat, that is, to nest on it like one cup inverted over another. The frame is preferably unitary and has a top frame portion, the downwardly facing surface of which corresponds generally to the shape of the sitting area of the underlying seat. The upwardly facing surface of the frame may be of different contour and/or cross-section than the underlying seat so as to provide a support of different configuration, greater width and/or length. Side portions extend downwardly from the top portion of the frame and are positioned and shaped to snugly embrace at least the upper portions of the sides of the underlying seat. Flanges or ribs preferably extend outwardly from the side portions; a cushioning material is secured to the top portion and sides, and may be supported in part by the flanges. The outside is covered with a leather or fabric which preferably matches or compliments the covering of the underlying passenger and/or driver seat. The seat enlarger is held in place by releasable securing means such as clips or a belt that is securable around a backrest, if present, or to the cycle frame or chassis.

DESCRIPTION OF THE DRAWINGS

The invention can best be further described by reference to the accompanying drawings, in which.

DETAILED DESCRIPTION OF THE INVENTION

Figure 1:
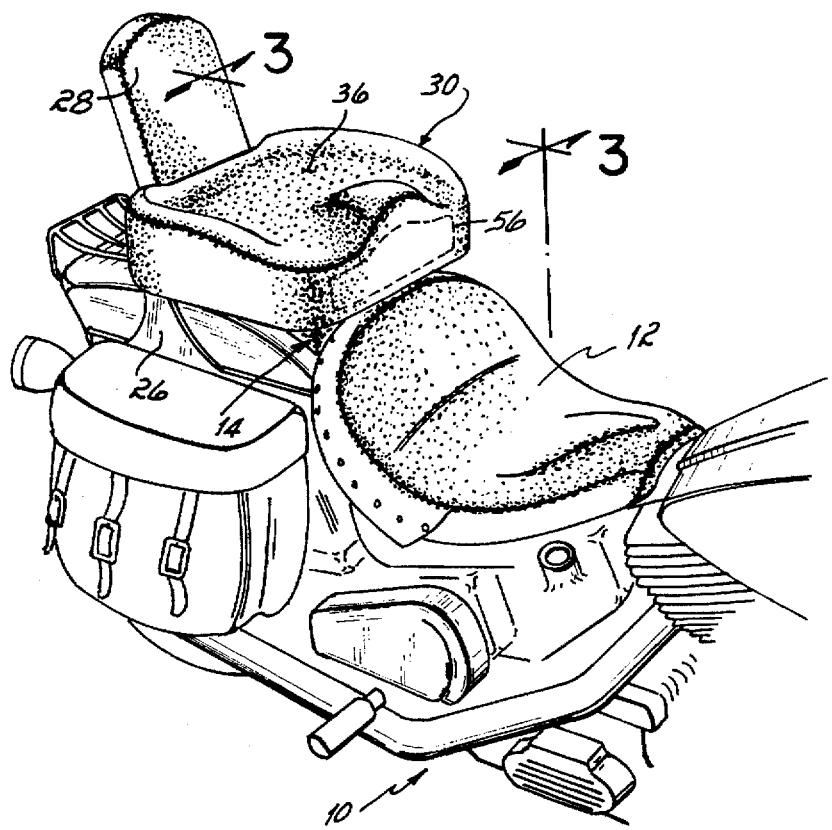
FIG. 1 is a partial perspective view of a motorcycle on which a passenger seat enlarger in accordance with this invention has been mounted.

The motorcycle designated by 10 in the drawings may be of known or standard type, and has an original or aftermarket driver seat 12 and, behind it, an original or aftermarket passenger seat 14. The passenger seat is partially obscured in FIG. 1 but is shown in more detail FIGS. 2, 3, and 4. The cycle 10, shown for purposes of illustration, is a Harley-Davidson model "FXSTC Custom Softail" and has a seat 14 of known type. However, it should be understood that the seat expander of this invention can be used on original or existing seats of other shapes and types such as a Harley-Davidson "Badlander"™ seat, or a touring seat, or other sizes and shapes of seats on cycles made by other manufacturers. The O.E.M. seat is usually covered with leather or vinyl, and may carry fringe, decorative spots, rosettes, or other decorations.

Driver seat 12 may be a large and comfortable saddle type seat, as shown in FIG. 1, while the original passenger seat 14 is usually narrower than the driver seat and is positioned behind and often somewhat higher than the driver seat. Passenger seat 14 has a seating surface 16, which for example may be generally rectangular in plan as shown, with sides 18 and a back surface 20 (see FIG. 3). The particular seat shown has a front surface 22, but the invention is also useful with seats which are an integral rearward extension of the driver seat and which have no front surface, like a Harley "Badlander." Seat 14 may be rigidly secured to the motorcycle frame and is not quickly removable.

In the particular instance shown, driver seat 12 has a comfortable saddle shape but the seating surface 16 of the passenger seat has a much narrower sitting area and as a result is less comfortable for long rides. A backrest 24, usually in the form of an inverted generally U-shaped square or round bar support, is connected to the cycle frame as by upstanding brackets 26 on each side of the fender. The backrest may have a padded back cushion 28.

Figure 2:
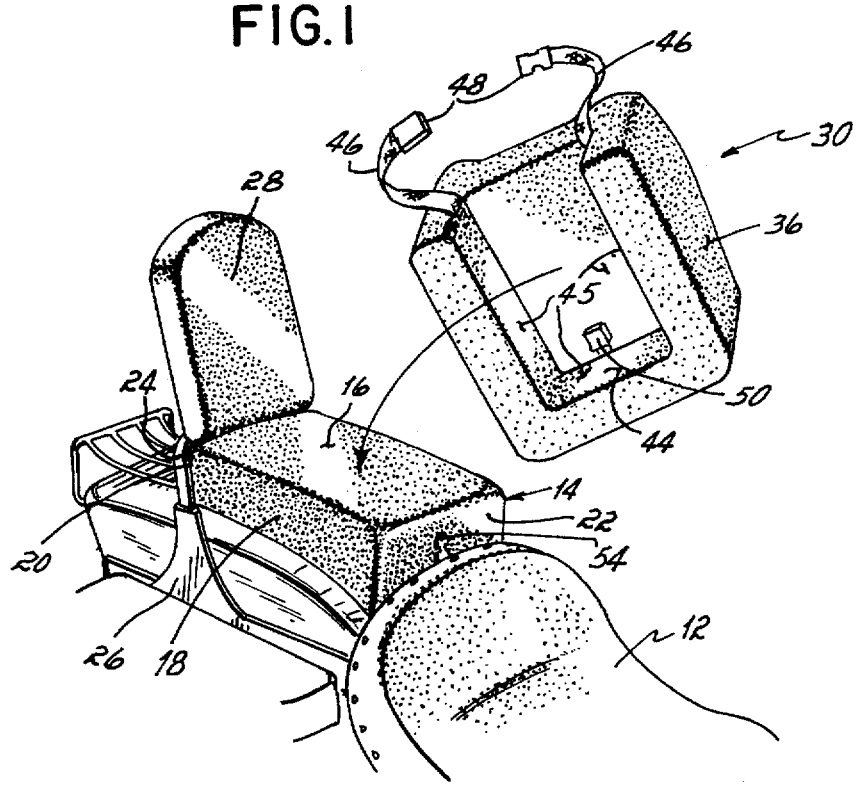
FIG. 2 is a view generally similar to FIG. 1 but shows the enlarger being applied over the original seat.
Figure 3:
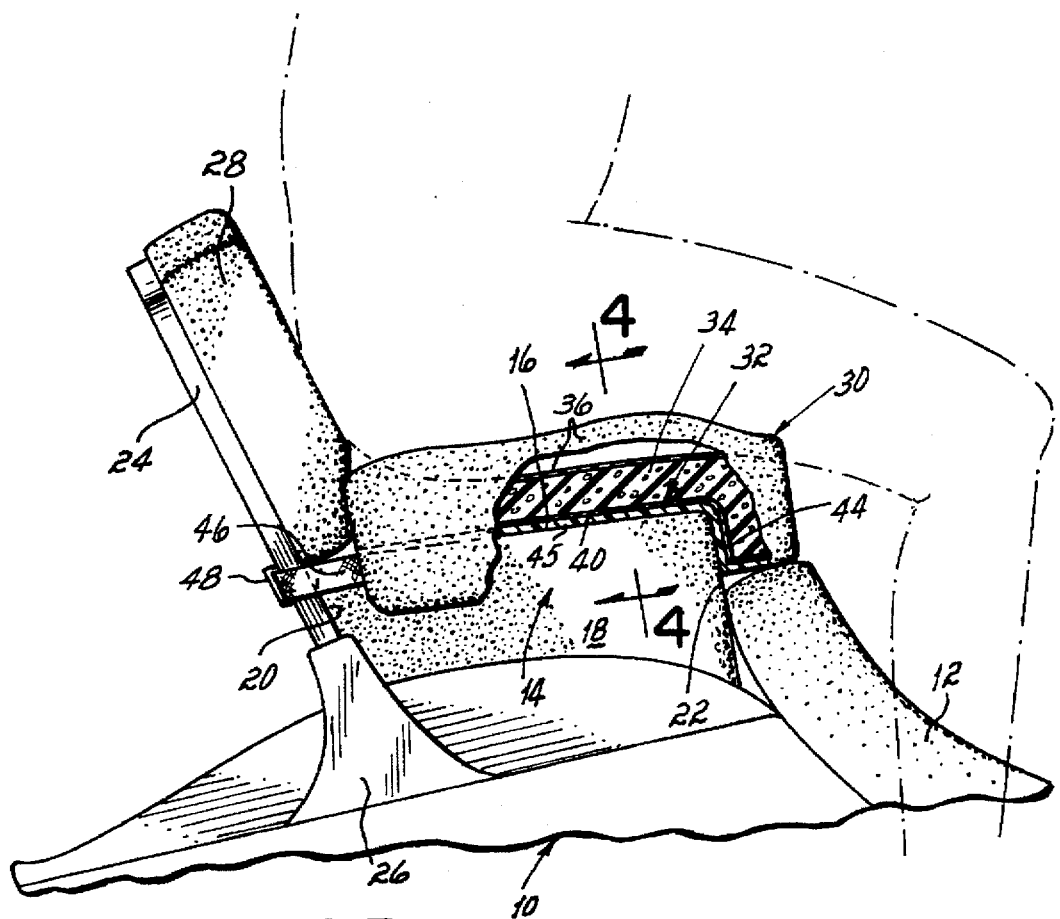
FIG. 3 is a longitudinal cross-section taken on line 3—3 of FIG. 1, with a passenger, shown by phantom lines, sitting on the enlarger.
Figure 4:
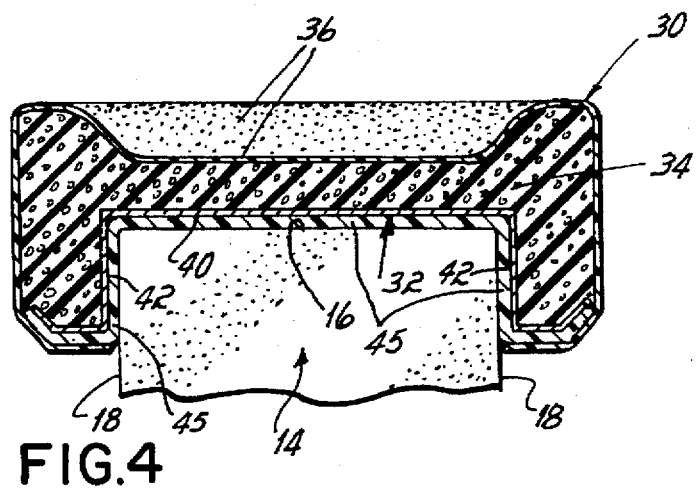
FIG. 4 is a transverse cross-section taken on line 4—4 of FIG. 3.

A passenger seat enlarger in accordance with one preferred form of this invention, designated generally by 30, includes a shaped frame 32, which may be molded in plastic or formed of sheet metal. It is covered with cushioning 34, which in turn is covered with a protective and decorative outer cover 36 of leather or the like, to match the original seats. The enlarger frame is shaped and sized so that it can be nested over the outside of the passenger seat; it need not embrace the driver seat although it may act as an additional backrest for the driver. The underlying passenger seat shown is generally rectangular, and the enlarger frame shown is also generally rectangular. More particularly, enlarger frame 32 has a top portion 40 and side portions 42, 42, which extend downwardly from the top portion, as shown in FIG. 4. Side portions 42 are arranged to substantially facially engage the sides 18,18 of the passenger seat. If the underlying seat has a front surface 22, as shown in FIGS. 2 and 3, then preferably seat enlarger 30 has a front portion 44 which is shaped to facially engage at least the upper part of that surface. This, and/or the securing means to be described, arrests rearward displacement. The frame may be open at the rear as shown (FIG. 2), but preferably has a frame rear portion 52 (see FIG. 5), which resists forward displacement of the enlarger on the seat. A thin layer 45 of foam, floc or other non-abrasive material may be applied to the inside of the frame, to minimize wear of the covering of the underlying seat. The cushioning 34 on the outer, visible surface of the seat enlarger can be secured by conventional means, for example by adhesive, to the frame 32. In the embodiment shown, the cushioning forms a tractor-style seat, on the generally rectangular frame.

As can be seen from the drawings, frame 32 of the seat enlarger (more specifically, its inside surface covering 45) nests (that is, embraces or stacks on) the seating surface 16 so as to cover at least the upper portions of the sides 18 of underlying passenger seat and preferably also the front and the rear of the seat. The more closely the shapes of the mating surfaces of the original seat and the frame correspond, the better the stability of the enlarger will be in use. Thus it is desirable that if, for example, the top or sides of the underlying seat are curved, the lower or undersurface of the frame be curved to match as closely as possible. The nested interfit provides stability so that the enlarger cannot move significantly in the lateral (cross-wise) and/or longitudinal (forward and backward) directions, relative to the underlying seat. The engagement of the enlarger sides 42, 42 with the corresponding sides 18, 18 of the underlying seat, reduces lateral sliding. Rearward slippage might tend to occur on rapid forward acceleration; engagement of the enlarger front portion 44 with the front 22 of the underlying passenger seat helps hold the seat enlarger against rearward slippage, as does a strap to be described. Optional rear frame portion 52 (see FIG. 5) resists relative forward displacement. If a rear frame portion cannot be provided (as by reason of interference with a back rest, as in FIG. 2), forward displacement can also be resisted by releasable securing means, preferably in the form of adjustable straps 46 with male-female snap buckles 48, secured around the backrest frame (see FIGS. 2 and 3). Alternatively, the securing means can connect directly to the bike frame, fender or shocks. For example, as shown in FIG. 5, the seat enlarger may be provided with adjustable straps 70 having hooks 72 or snaps that are engagable with D-rings 74 mounted on the frame or strut.

In the absence of a backrest it is further desirable to provide a buckle 50 at the front of the seat enlarger frame, for interconnection with a cooperating buckle 54 that is mounted, for example by rivets, at the rear of driver seat 12. This helps hold the front of the seat enlarger from rotating upwardly and rearwardly, away from seating surface 16.

Figure 5:
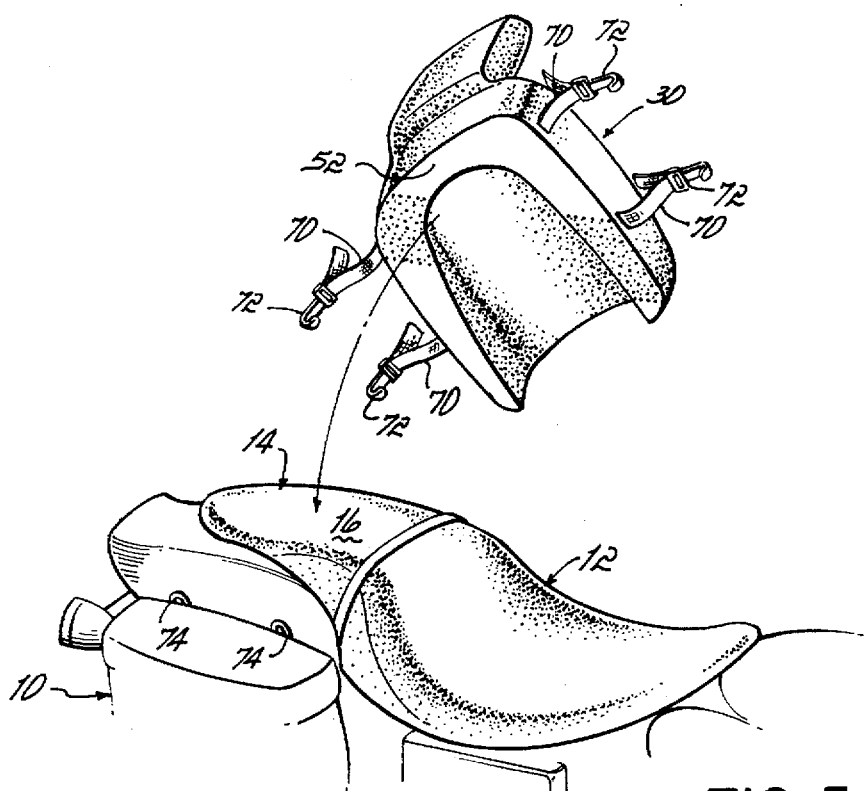
FIGS. 5 and 6 show alternative configurations of seat enlargers in accordance with the invention.
Figure 6:
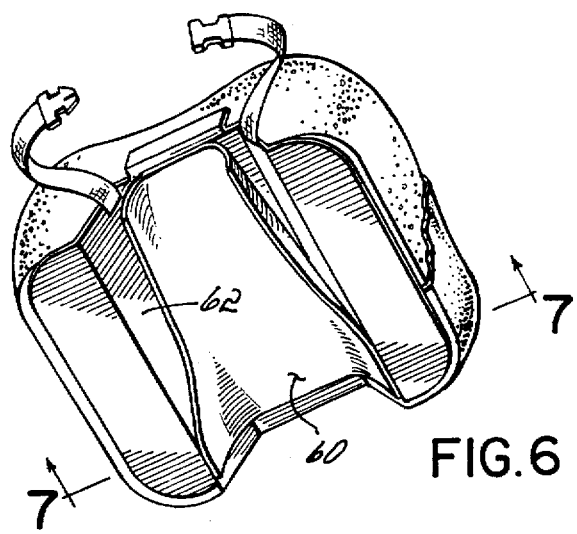

FIGS. 5 and 6 show other embodiments of passenger seat enlargers in accordance with the invention, shaped to nest on other configurations of underlying passenger seats.

Figure 7:
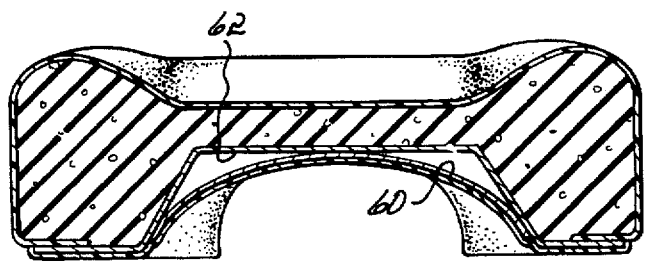
FIG. 7 is a lateral section taken on line 7—7 of FIG. 6.

Instead of the box-like shape shown, the frame may have an upper surface of a different configuration than its underface, as shown in FIGS. 5, 6 and 7. The frame shown in FIGS. 6 and 7 comprises a lower sheet metal component 60 which is shaped to fit on a long and narrow "Badlander"™ style passenger seat, and an upper sheet metal portion 62 configured to support cushioning for a "tractor" type seating surface. (Alternatively, the frame can be molded in plastic.) The lower component 60 of the frame is shaped to embrace the top of the underlying seat, whatever its shape, whereas the outside and upper surfaces 62 of the frame are shaped to support the cushioning for the desired "tractor seat" configuration.

It is also contemplated that an adjustably inflatable air bladder or chamber, indicated by phantom line 56 in FIG. 1, may be positioned in the cushioning on frame front portion 44 to provide additional cushioning and/or further backrest support for the driver. An adjustably inflatable bladder can also be provided between frame side portions 42 and the underlying seat, instead of or in addition to other material, to provide a tighter fit against sides 18 of seat 14.

While the invention has been described above primarily in relation to an enlarger for a passenger seat because that presents the greater need, it should be understood that in some cases the invention can be used to enlarge the area or configuration of the driver seat.

Having described the invention, what is claimed is:

1. A removable passenger seat enlarger for use on a motorcycle of the type having a driver's seat with a passenger seat behind it, the passenger seat having a seating surface and sides extending generally downward from said seating surface, said passenger seat enlarger comprising, a frame including a top portion and side portions extending generally downward from said top portion, the shape of said top portion of said frame having an undersurface shaped to generally correspond to the shape of said seating surface of said passenger seat so as to be nestable thereover and to cover substantially said entire seating surface when placed thereon, said side portions of said frame shaped to cover and facially engage a substantial portion of each side of said passenger seat so as to reduce lateral shifting of the seat, cushioning covering at least said top and side portions of said frame, said cushioning providing a larger sitting area than the seating surface of said passenger seat, and releasable securing means for securing said seat enlarger over a passenger seat, said securing means together with the nesting of said enlarger over said passenger seat preventing displacement of said enlarger on the seat.

2. The passenger seat of claim 1, further wherein said top portion and side portions are configured to substantially facially engage the seating surface and side of said passenger seat.

3. The passenger seat enlarger of claim 2, wherein said frame is hat-shaped as viewed in transverse section.

4. The passenger seat enlarger of claim 1, further wherein said frame has a front portion which is shaped to fit adjacent a front of said passenger seat, thereby to resist rearward displacement and provide back support for the driver.

5. The passenger seat enlarger of claim 1, further wherein said frame has a rear portion which is shaped to fit against a rear of said passenger seat or a back rest of said passenger seat, thereby to resist forward displacement.

6. The passenger seat enlarger of claim 1, wherein said cushioning is shaped to provide a tractor-seat shaped sitting area.

7. The passenger seat enlarger of claim 1, wherein said releasable securing means includes a belt connected to said frame which is adapted to be secured around a backrest of said passenger seat and thereby resist forward and lateral movement of said enlarger relative to said passenger seat.

8. The passenger seat enlarger of claim 1, wherein said releasable securing means includes a connector secured to said frame for attachment to a cooperating connector at the front of said passenger seat.

9. The passenger seat enlarger of claim 1, wherein said top portion and side portions of said frame are shaped to closely embrace the seating surface and sides of said passenger seat.

10. The passenger seat enlarger of claim 1, further wherein flanges extend outwardly from the side portions of said frame, said cushioning supported at least in part on said flanges.

11. The passenger seat enlarger of claim 1 further including a fluid-containing bladder.

12. The passenger seat enlarger of claim 11, wherein said bladder is an adjustably inflatable air bladder and is positioned at a front of said passenger seat enlarger, to provide a back support for the driver.

* * * * *